Figure 1:
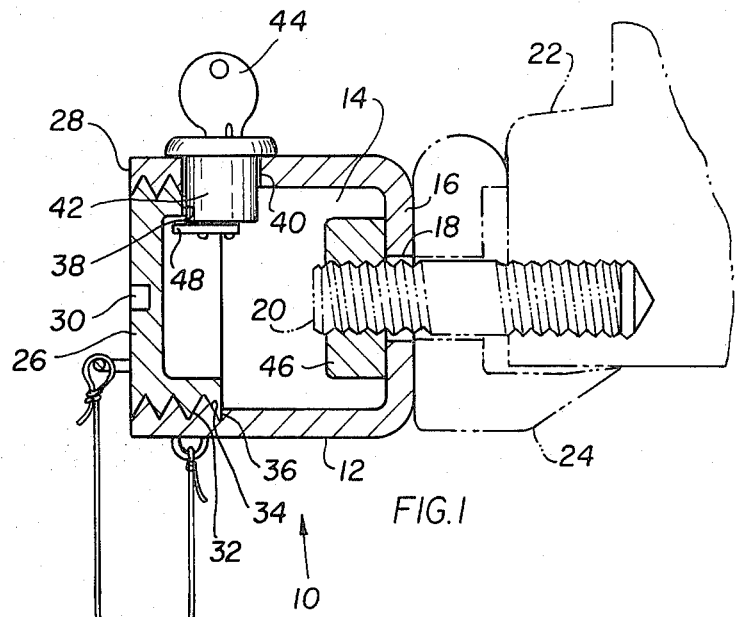

United States Patent [19]
Van Brunt et al.

[11] 3,789,635
[45] Feb. 5, 1974

[54] STUD LOCK

[76] Inventors: John Van Brunt; Donald Tringali, both of 222 Hudson St., Copiague, N.Y. 11726

[22] Filed: Mar. 17, 1972

[21] Appl. No.: 235,593

[52] U.S. Cl. .............................................. 70/232
[51] Int. Cl. ......................................... F16b 41/00
[58] Field of Search ..... 70/166, 209, 211, 232, 260, 70/416, 429; 248/203

[56] References Cited
UNITED STATES PATENTS

| 200,599 | 2/1878 | Beachman | 70/232 X |
|---|---|---|---|
| 1,430,837 | 10/1922 | Oakes | 70/232 X |
| 1,642,589 | 9/1927 | Loomis | 70/232 X |
| 2,377,542 | 6/1945 | Crew | 70/232 |
| 2,469,973 | 5/1949 | Malluk | 70/232 |
| 3,696,646 | 10/1972 | Loscalzo | 70/232 X |

FOREIGN PATENTS OR APPLICATIONS

| 1,228,065 | 8/1960 | France | 70/232 |
|---|---|---|---|
| 667,571 | 10/1938 | Germany | 70/232 |
| 800,104 | 9/1950 | Germany | 70/232 |

*Primary Examiner*—Werner H. Schroeder
*Attorney, Agent, or Firm*—Bauer & Amer, P. C.

[57] ABSTRACT

A stud lock for preventing access to the stud of an automobile wheel and the like by enclosing the stud and its securing nut in a housing, the access to which is closed and opened by a cover that is prevented from accidental displacement by a lockable element.

10 Claims, 2 Drawing Figures

PATENTED FEB 5 1974 3,789,635

STUD LOCK

This invention relates to a lock and more particularly to a lock to prevent unauthorized access to a stud and its securing nut of the type used on automobile wheels and the like.

The large number of incidents of theft of automobile wheels and other apparatuses has given rise to the need for effective and yet relatively inexpensive devices for preventing such thefts. The present invention is directed toward a solution of that problem.

An object of the invention is to provide a simple, yet inexpensive, lock for studs and their securing means such as are used on vehicle wheels.

Another object of the invention is to provide a lock that can be applied to the stud and about the securing nut or other securing means without disturbing or interfering with the full utilization of the stud and the securing means and/or the remaining related structure with which the stud forms a part.

Still another object is to provide a stud lock that can be positioned about and on the stud so as to encompass the securing means cooperating with the stud to prevent the undesired removal of such securing means, yet to provide access to the securing means when it is desired to remove the same without, at the same time, having to remove the lock from such stud.

Accordingly, an object and feature of the invention resides in the provision of a lock housing that can remain mounted on the stud at all times, that will fully enclose it and its securing means to prevent theft, and when it is desired to remove the securing means, access is afforded to the same through the disengagement of a cover that opens and closes an entrance to the housing.

Figure 2:
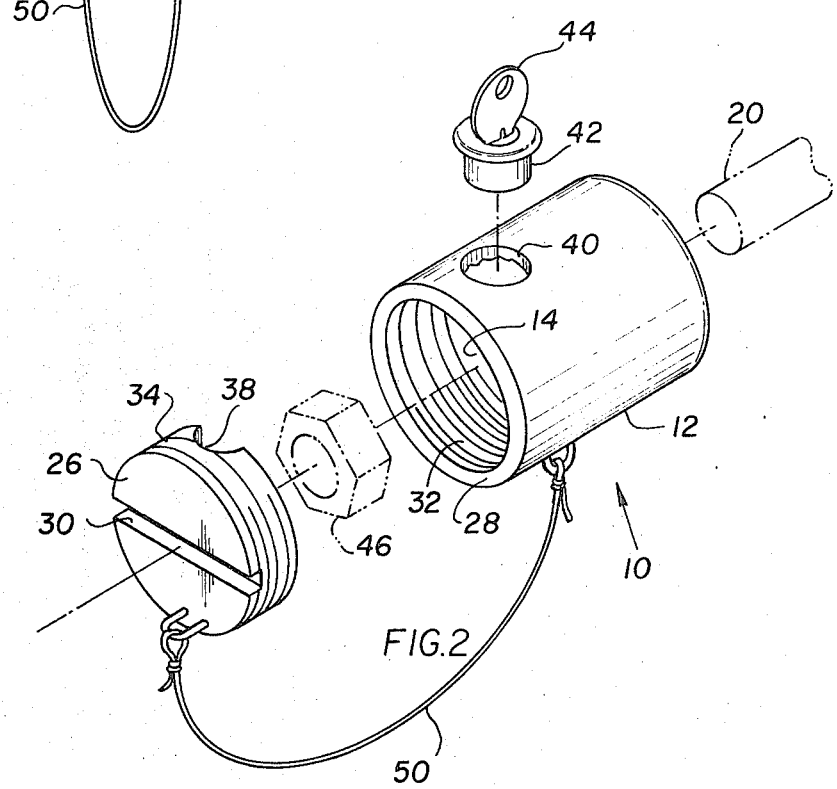

The above description, as well as further objects, features and advantages of the present invention, will be more fully appreciated by reference to the following detailed description of a presently preferred, but nonetheless illustrative, embodiment in accordance with the present invention, when taken in conjunction with the accompanying drawings wherein:

FIG. 1 is a vertical cross-section of the stud lock constructed according to the teaching of the invention and shown mounted in operative locked condition, and FIG. 2 is an exploded perspective view of the stud lock of FIG. 1.

Referring now to the drawing, the stud lock structure there shown is generally identified by the numeral 10. The stud lock 10 comprises a housing 12 having an interior chamber 14 defined by the outer circumscribing wall of the housing 12 and a stud receiving wall 16. Defined in the stud receiving wall 16 is a through opening 18 which is adapted to permit the passage and extension of a wheel stud 20 for access within the chamber 14.

The stud 20 generally forms a tight and secure connection with a vehicle wheel hub 22 which is secured in any conventional manner to the vehicle axle. In truck wheel constructions, the tire (not shown) is generally held to the wheel hub by a plurality of rim cleats 24, each of which is mounted on a respective stud 20. Because of the relatively tight engagement of the stud 20 with the wheel hub, the two are not intended to separate or come apart. In smaller passenger type automobile wheels, the cleats 24 may not be utilized and the wheel hub generally supports the tire directly.

As the description proceeds, those skilled in the art will readily recognize that although the stud lock 10 of the present invention has been described with respect to vehicle wheels, studs for mounting numerous other articles also may be locked to prevent theft. For example, studs for mounting motorboat engines can be secured from theft by the present lock structure. Therefore, although the present disclosure is described for use with studs of vehicle wheels, the same has been done solely for ease of explanation and it should not constitute a limitation upon the scope of the use of the invention since its application to studs for other purposes should become obvious.

The stud lock 10 further includes a cover 26 that is adapted for cooperative engagement with the housing 12 to close and open access to the chamber 14. The housing 12 has an end 28 thereof which is normally open and, therefore, forms an entrance to the chamber 14. Such chamber 14 is adapted to be closed by the application of the cover 26 into engagement with the entrance such as is shown in FIG. 1.

When the cover 26 is applied to close the entrance of the chamber 14, it may be substantially flush with the housing end 28 as shown in FIG. 1 or it may extend more deeply into the housing. In any event, the cover 26 may have a slot 30 at its exposed outer surface for the application of a screwdriver, coin or any handy or convenient blade-type implement. The engaging means between the housing 12 and the cover 26 is shown in the form of cooperative threaded surfaces 32 and 34 since it is most convenient to thread each of these members in this manner. It can be recognized that other convenient engaging means may be utilized for this purpose, for example, a bayonet-type engagement. The depth to which the cover 26 may be engaged with the housing 12 may be determined and limited by a shoulder 36 defined on the housing 12.

Both the cover 26 and the housing 12 have alignable locking surfaces 38 and 40, respectively. The locking surface 38 of the cover 26 may be in the form of an axially extending keyway or aperture defined in the wall thereof that will face the adjacent peripheral wall of the housing 12, while the locking surface 40 of the housing 12 may be in the form of a through opening defined in the outer wall of the housing 12. An operable lock element, which may take the form of a key operated tumbler 42, is insertable through the opening 40 in the peripheral wall of the housing 12 and projects radially inward for engagement with the aligned locking surface 38 of the cover 26. Although a key operated tumbler 42 is shown wherein the key is designated by the numeral 44, it will be recognized that any other convenient selectively operable means may be utilized as, for example, a combination lock insertable through and for engagement with the alignable locking surfaces 38 and 40.

In operation, the stud lock 10 is conveniently applied to the stud 20 by sliding the housing 12 over the stud such that the stud passes through the opening 18 in the wall of the housing containing the chamber 14 and is encompassed by the chamber. The chamber 14 is of sufficiently large area and spaced from about the stud as to permit the application and the removal of a securing nut 46 to the stud. Thus, the securing nut-receiving socket of the lug wrench is adapted to fit within the chamber 14 and within the encompassing housing 12 so as to be able to engage the securing nut 46 to apply or remove the same from the stud 20. One of the elemental and beneficial features of the present invention resides in the fact that during the application and the removal of the securing nut 46 to the stud 20, the housing 12 need not be removed from its position about the stud. Thus, the housing 12 functions as a guide for the lug wrench and is not easily lost in the same manner as other lock structures which need to be removed from the stud in order to apply or remove the securing nut 46 to or from the same.

After the securing nut 46 is applied to the stud while the housing 12 remains encompassing both the nut and stud, the enclosure of the accessible portion of the stud 20 and its securing nut 46 is completely and fully accomplished by the application of the cover 26 to the entrance of the chamber 14 and at the end 28 of the housing. When the cover 26 is applied to the entrance of the chamber 14, it closes access to the interior of the chamber whereas its removal from the entrance of the chamber permits access thereto.

By tightening down the cover 26 along the threaded engagement 32 and 34 with the housing 12 until it seats against the shoulder 36, the locking surfaces 38 and 40 are automatically positioned in alignment with each other. This alignment of the locking surfaces permits the insertion of the selectively operable tumbler 42 through the opening 40 of the housing 12, through the keyway 38 having the locking surfaces thereon of the cover 26, and therebeyond. The turning of the key or the operation of a dial of a combination tumbler causes the misalignment of a latch 48, which forms an usual part of the tumbler as shown in FIG. 1, such that the tumbler 42 cannot be dislodged from its engagement with the locking surfaces 38 and 40 of the cover 26 and the housing 12 until such time as the latch 48 is removed from its disaligned position.

From the above, it will be clear that the present invention provides an unusually simple, inexpensive and yet convenient stud lock 10 that can remain in position about the stud even after the removal of the securing nut 46. To further prevent the loss of the operative parts of the stud lock 10, one can readily recognize that the cover 26 may be chained or otherwise linked to some convenient portion of the housing 12 so that when it is removed from the entrance of the chamber 14 it will be readily accessible for future use. This has been illustrated by the cord 50 joining the housing and cover together.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A stud lock comprising a housing having a chamber therein and an opening defined in the wall thereof through which a stud may extend into said chamber for the application of a securing means to the stud while the same is within said chamber, said housing having an access opening to said chamber,
a cover for said housing chamber,
engaging means on said cover and housing enabling the same to be engaged to close access to said chamber and to be disengaged to afford access to said chamber,
and lock means movable into engagement between said housing and cover to prevent disengagement of said cover and housing and being movably disengageable from between said housing and cover to permit said cover and housing to be disengaged.

2. A stud lock as in claim 1,
said chamber being larger than the stud and the securing means therein to enable the application and removal of the securing means to the stud without removing the stud from the housing chamber,
and an access entrance defined in said housing and communicating with said chamber through which the securing means may be applied and removed from said stud,
said housing engaging means being at said access entrance of said housing and on a wall of said cover.

3. A stud lock as in claim 2,
said cover and housing having keyways alignable with each other when said cover closes said chamber to receive said lock means therein.

4. A stud lock as in claim 3,
said engaging means on said cover and housing being cooperatively engaged threaded surfaces.

5. In a lock for threaded studs having a securing nut thereon,
a housing encompassing the securing nut,
said housing having a chamber larger than the securing nut to provide access to such securing nut to enable the application and removal of the securing nut from within said chamber without removal of the housing from the stud,
a wall of said housing between the securing nut and stud and having an opening defined therein to enable the stud to extend into said chamber,
said chamber having an access entrance to the securing nut,
a cover cooperable with said housing to close and open said entrance,
and operable lock means insertable to lock said cover to said housing to close said entrance and removable to enable the removal of said cover to open said entrance.

6. A stud lock as in claim 5,
threaded engaging means on said cover and housing cooperable to enable said cover to be releasably threaded closed relative to said entrance.

7. A stud lock as in claim 6,
alignable locking surfaces on said cover and housing,
and said operable means being engageable with said alignable locking surfaces of said cover and housing to lock said cover and housing together when said cover closes said entrance.

8. A stud lock as in claim 7,
said locking surface on said housing being defined by an opening through a wall thereof extending into said chamber,
and said locking surface on said cover being an aperture defined in a wall thereof facing the wall of said housing through which said locking surface is defined.

9. A stud lock as in claim 5,
wherein said operable means is a key operated tumbler engageable between said housing and said cover when said cover is cooperable with said housing to close said entrance.

10. A stud lock comprising a housing having a chamber therein and an opening defined in the wall thereof through which a stud may extend into said chamber for the application of a securing means to the stud while the same is within said chamber, said housing having an entrance providing access to said chamber, a cover, means on said cover and housing cooperable to maintain said cover closed with respect to said entrance of said housing, and lock means insertable into and engageable with said housing and cover to prevent disengagement of said cover and housing and being removable from said housing and from disengagement with said cover to permit said cover and housing to be disengaged.

* * * * *